(12) United States Patent
Innes

(10) Patent No.: US 12,128,633 B2
(45) Date of Patent: *Oct. 29, 2024

(54) STEREOLITHOGRAPHY SYSTEM FOR ACCURATELY ESTABLISHING BUILD PLANE

(71) Applicant: 3D Systems, Inc., Rock Hill, SC (US)

(72) Inventor: Eric M. Innes, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,947

(22) Filed: Jul. 13, 2023

(65) Prior Publication Data

US 2023/0356473 A1 Nov. 9, 2023

Related U.S. Application Data

(63) Continuation of application No. 17/945,700, filed on Sep. 15, 2022, now Pat. No. 11,738,518.

(Continued)

(51) Int. Cl.
*B33Y 10/00* (2015.01)
*B29C 64/124* (2017.01)
*B29C 64/214* (2017.01)
*B29C 64/232* (2017.01)
*B29C 64/236* (2017.01)
*B29C 64/393* (2017.01)
*B33Y 30/00* (2015.01)
*B33Y 50/02* (2015.01)

(52) U.S. Cl.
CPC .......... *B29C 64/393* (2017.08); *B29C 64/124* (2017.08); *B29C 64/214* (2017.08);
(Continued)

(58) Field of Classification Search
None
See application file for complete search history.

(56) References Cited

U.S. PATENT DOCUMENTS 5,174,931 A 12/1992 Almquist et al.
5,780,070 A 7/1998 Yamazawa et al.
(Continued)

FOREIGN PATENT DOCUMENTS

EP 1769902 B1 4/2007

OTHER PUBLICATIONS

PCT International Search Report for PCT Application No. PCT/US2022/043661, mailed Dec. 7, 2022 (6 pages).
(Continued)

*Primary Examiner* — Yung-Sheng M Tsui

(57) ABSTRACT

A three-dimensional (3D) printing system includes a vessel, a coating subsystem, a calibration block, and a controller. The vessel is configured to contain a photocurable resin having a resin upper surface. The coating subsystem includes a coater module including a coater blade, a lateral movement mechanism coupled to the coater module, a sensor mounted to the coater module, and a vertical actuator system. The calibration block has a calibration surface. The controller is configured to operate the lateral movement mechanism to position the coater blade over the calibration block, operate the vertical actuator system to lower the coater blade into engagement with the calibration surface of the calibration block, operate the sensor to measure a distance to the calibration block, and store the distance as indicative of a vertical position of a lower edge of the coater blade.

15 Claims, 7 Drawing Sheets

Related U.S. Application Data

(60) Provisional application No. 63/246,536, filed on Sep. 21, 2021.

(52) U.S. Cl.
CPC .......... *B29C 64/232* (2017.08); *B29C 64/236* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,902,537 A | 5/1999 | Almquist et al. | |
| 6,733,267 B2 | 5/2004 | Chapman et al. | |
| 7,520,740 B2 | 4/2009 | Wahlstrom et al. | |
| 7,585,450 B2 | 9/2009 | Wahlstrom et al. | |
| 7,621,733 B2 | 11/2009 | Reynolds et al. | |
| 7,690,909 B2 | 4/2010 | Wahlstrom et al. | |
| 9,075,409 B2 | 7/2015 | El-Siblani et al. | |
| 10,596,803 B2 * | 3/2020 | Crear | B29C 64/393 |
| 2006/0219163 A1 | 10/2006 | Merot et al. | |
| 2007/0075459 A1 * | 4/2007 | Reynolds | B33Y 40/00 425/169 |
| 2007/0077323 A1 | 4/2007 | Stonesmith et al. | |
| 2020/0139625 A1 * | 5/2020 | Allanic | B33Y 40/00 |

OTHER PUBLICATIONS

PCT Written Opinion for PCT Application No. PCT/US2022/043661, mailed Dec. 7, 2022 (10 pages).

* cited by examiner

STEREOLITHOGRAPHY SYSTEM FOR ACCURATELY ESTABLISHING BUILD PLANE

CROSS REFERENCE TO RELATED APPLICATIONS

This application is a continuation of U.S. application Ser. No. 17/945,700 which was filed on Sep. 15, 2022, which claims priority to U.S. Provisional Application Ser. No. 63/246,536, Entitled "STEREOLITHOGRAPHY SYSTEM FOR ACCURATELY ESTABLISHING BUILD PLANE" by Eric M. Innes, filed on Sep. 21, 2021, incorporated herein by reference under the benefit of U.S.C. 119 (e).

FIELD OF THE INVENTION

This non-provisional patent application claims priority to U.S. Provisional Application Ser. No. 63/246,536, Entitled "Stereolithography System for Accurately Establishing Build Plane" by Eric M. Innes, filed on Sep. 21, 2021, incorporated herein by reference under the benefit of U.S.C. 119(e).

FIELD OF THE INVENTION

The present disclosure concerns an apparatus and method for the digital fabrication of three-dimensional (3D) articles by a layer-by-layer selective radiative curing of a photocurable build material. More particularly, the present disclosure concerns an automated way of forming a build plane by calibrating a height and alignment of a coater blade to a upper surface of the build material.

BACKGROUND 3D printing systems are in wide use for prototyping and manufacturing articles. One type of 3D printing system utilizes a process called stereolithography. A typical stereolithography system utilizes a resin vessel, an imaging system, and a build plate within liquid photocurable resin held by the resin vessel. An article is manufactured in a layer-by-layer manner by selectively imaging and radiatively curing layers of the photocurable resin over the build plate. One challenge is to form liquid layers of the photocurable resin with an accurate and repeatable vertical dimension without difficult manual alignment procedures.

SUMMARY

Figure 1:
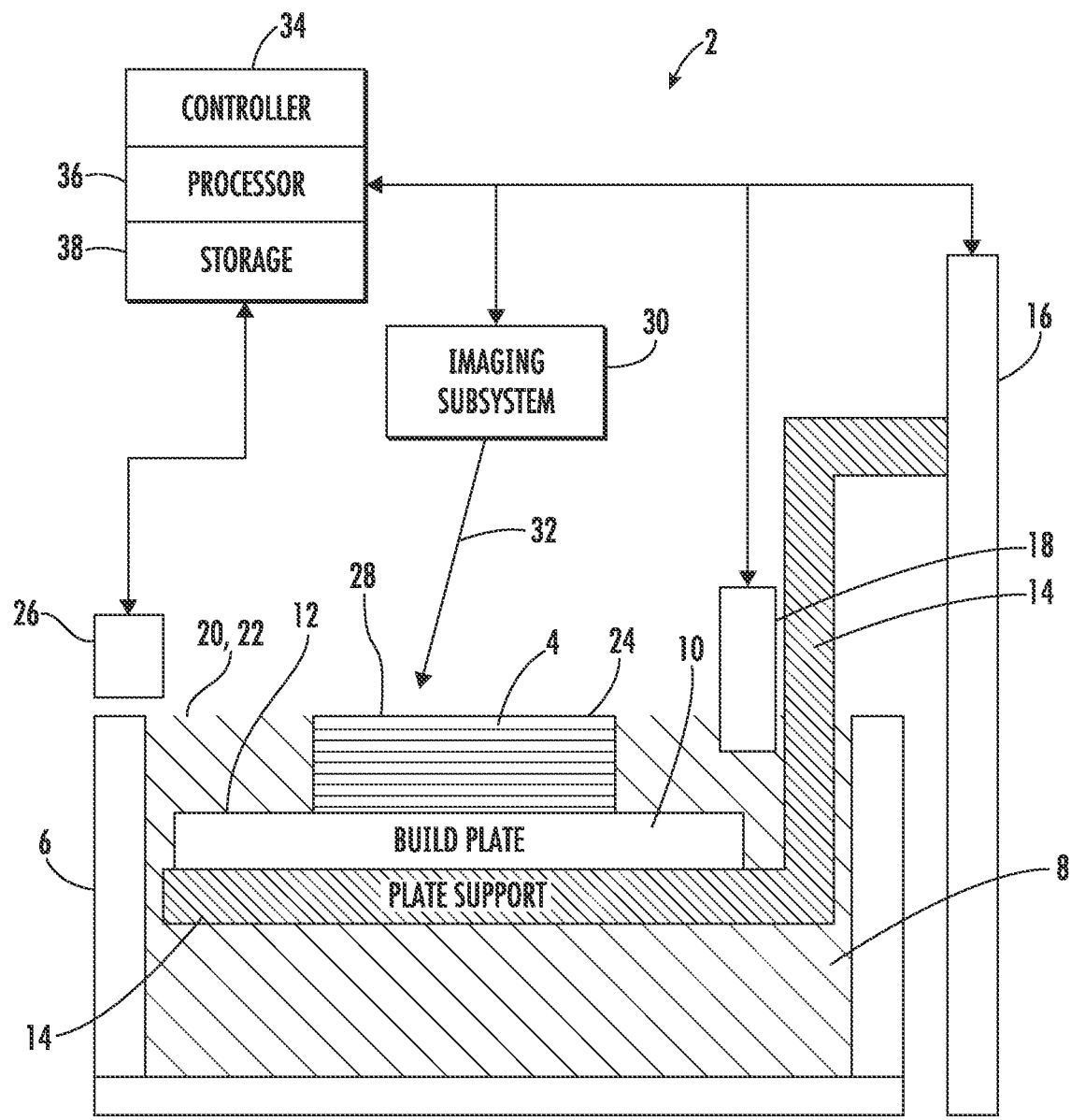
FIG. 1 is a schematic illustration of an embodiment of a three-dimensional (3D) printing system for manufacturing or fabricating a 3D article.

In a first aspect of the disclosure, a three-dimensional (3D) printing system includes a vessel, a coating subsystem, a calibration block, and a controller. The vessel is configured to contain a photocurable resin having a resin upper surface. The coating subsystem includes a coater module including a coater blade, a lateral movement mechanism coupled to the coater module, a sensor mounted to the coater module, and a vertical actuator system. The calibration block has a calibration surface. The controller is configured to operate the lateral movement mechanism to position the coater blade over the calibration block, operate the vertical actuator system to lower the coater blade into engagement with the calibration surface of the calibration block, operate the sensor to measure a distance to the calibration block, and store the distance as indicative of a vertical position of a lower edge of the coater blade.

In one implementation, the 3D printing system includes a pair of linear bearings that individually extend along a Y-axis. The coater module extends along an X-axis that is orthogonal to the Y-axis. The coater module includes two end portions at opposed ends of the coater module with respect to the X-axis. The two end portions individually engage the linear bearings to support and guide the coater module along the Y-axis. The lateral movement mechanism includes motorized belt system including two belts that are individually attached to the two end portions. The vertical actuator system includes a plurality of actuators that are configured to vertically position the pair of linear bearings to control the vertical position of the coater blade as it is transported along the Y-axis. The vertical actuator system includes four vertical actuators including, for each of the linear bearings, a rear vertical actuator and a front vertical actuator that are spaced apart with respect to the Y-axis. The sensor includes two sensors that individually are positioned on one of the two end portions of the coater module. The calibration block includes two calibration blocks that individually correspond to one of the two sensors.

In another implementation, the controller is further configured to operate the lateral movement mechanism to position the coater blade over the resin upper surface, operate the sensor to obtain a sensed position of the resin upper surface, and operate the vertical actuator system to vertically position the coater blade based upon a comparison of the vertical position of the lower edge of the coater blade relative to the sensed position of the resin upper surface.

In yet another implementation, the 3D printing system includes a vertical movement mechanism coupled to a build platform and an imaging module. The controller is configured to operate the vertical movement mechanism to position an upper surface of the build platform or a 3D article at a build plane, operate the vertical actuator system to position the lower edge of the coater blade at the build plane, operate the lateral movement mechanism to translate the lower edge of the coater blade over the upper surface to form a new layer of the photocurable resin over the upper surface, operate the imaging module to selectively cure the new layer of photocurable resin, and repeat operation of the elevator mechanism, the vertical movement mechanism, the lateral movement mechanism, and the imaging module to complete fabrication of the 3D article in a layer-by-layer manner.

In a second aspect of the disclosure, a three-dimensional (3D) printing system includes a vessel, a coating subsystem, a calibration block, and a controller. The vessel is configured to contain a photocurable resin having a resin upper surface. The coating subsystem includes a coater module including a coater blade, a lateral movement mechanism coupled to the coater module, a sensor mounted to the coater module, and a vertical actuator system. The calibration block has a calibration surface. The controller is configured to operate the lateral movement mechanism to position the coater blade over the calibration block, operate the vertical actuator system to lower the coater blade into engagement with the calibration surface of the calibration block, operate the sensor to measure a distance Do to the calibration block, operate the lateral movement mechanism to position or translate the coater blade over the resin upper surface, operate the sensor to measure a distance D to the resin upper surface, and compute a distance d from a lower edge of the coater blade to the resin upper surface, $d=D-D_0$.

In one implementation the coater blade has a major axis along an X-axis. The lateral movement mechanism is configured to transport the coater blade along a Y-axis that is orthogonal to the X-axis. The sensor includes two sensors that are spaced apart with respect to the Y-axis. The calibration block includes two calibration blocks. Operation of the lateral movement mechanism to position the coater blade over the calibration block includes positioning each of the two sensors over one of the two calibration blocks. The distance $D_0$ is measured for each of the two sensors.

DETAILED DESCRIPTION OF THE PREFERRED EMBODIMENTS

FIG. 1 is a schematic illustration of an embodiment of a three-dimensional (3D) printing system 2 for manufacturing or fabricating a 3D article 4. In describing system 2, mutually orthogonal axes X, Y, and Z will be utilized and otherwise referred to as an X-axis, a Y-axis, and a Z-axis. Axes X and Y are lateral axes that are generally horizontal. The Z-axis is a vertical axis that is generally aligned with a gravitational reference. The term "generally" implies that a direction or magnitude is not necessarily exact but is by design. Thus the term "generally horizontal" means horizontal (perpendicular to a gravitational vector) to within design and manufacturing tolerances. The term "generally aligned" means aligned to within design and manufacturing tolerances.

3D printing system 2 includes a resin vessel 6 for containing a photocurable resin 8. In the illustrated embodiment, photocurable resin 8 includes, inter alia, a monomer, a catalyst, and a filler. The catalyst allows the resin 8 to be hardened and cured with an application of radiation such as blue radiation, violet radiation, or ultraviolet radiation that would typically have a wavelength of less than about 450 nm (nanometers). Photocurable resins for stereolithography systems are known in the art.

System 2 includes a build plate 10 with an upper surface 12 upon which the 3D article 4 is formed. A build plate support structure 14 supports build plate 10. A vertical movement mechanism 16 is operable to vertically position the build plate support structure 14 and in doing so vertically position the build plate 10. In one embodiment, the vertical movement mechanism 16 includes a fixed motor coupled to a lead screw. The build plate support structure 14 includes a threaded bearing that receives the lead screw. As the motor turns the lead screw, the effect is to controllably translate the build plate support structure 14 up or down. In addition, the vertical movement mechanism 16 and the build plate support structure 14 include mutually engaging linear bearings that assure linear motion of the build plate support structure along the vertical axis Z. Various vertical and lateral movement mechanisms are known in the field of stereolithography. All typically include linear bearings for guiding motion but the movement can be based upon a lead screw, a rack and pinion system, a belt and pulley system, or well-known means of imparting motion.

System 2 includes a resin level subsystem 18 configured to maintain a resin upper surface 20 at a predetermined vertical position. In the illustrated embodiment, the resin upper surface 20 is generally coincident with a build plane 22. The resin level subsystem 18 can include a resin level sensor and a weight coupled to a pully system. The weight is partially immersed in the resin 8 such that raising and lowering the weight alters a vertical position of the resin upper surface 20 via volumetric displacement. The resin level sensor outputs a signal indicative of a vertical position of the resin upper surface 20. The signal is analyzed and the pully system is operated to raise and lower the weight to maintain the resin upper surface 20 to be generally coincident with the build plane 22.

An "upper surface" 24 can be defined which is either the upper surface 12 or an upper surface 24 of the 3D article 4 when it is partially formed. Before forming an additional material layer onto the 3D article 4, the upper surface 24 is positioned at a vertical position that is generally one material layer thickness below the build plane 22.

System 2 includes a coating subsystem 26. After upper surface 24 is positioned one layer thickness below build plane 22, the coating subsystem 26 is configured to pass over the upper surface and to define a new layer 28 of the resin 8 over the upper surface 24. Details of the coating subsystem 26 will be discussed infra. The new layer 28 of resin 8 has the resin upper surface 20 that is generally coincident with build plane 22.

System 2 includes an imaging subsystem 30. Imaging subsystem 30 is configured to scan an energy beam 32 over the build plane 22 to selectively cure and harden the new layer 28 of resin 8 and to form a new material layer of the 3D article 4. In an illustrative embodiment, imaging subsystem 30 includes a laser that generates a radiation beam 32 that is reflected by a scanner. The scanner scans the radiation beam 32 over the build plane 22. In an illustrative embodiment, the scanner includes two galvanometer mirrors including an X-mirror and a Y-mirror configured to scan the radiation beam along the X-axis and the Y-axis respectively over the build plane 22. Imaging subsystems are known in the field of stereolithography. Another imaging subsystem can be based upon a "light bar array" of light emitting devices that scans over the build plane 22. Yet another imaging subsystem can be based upon projection of a pixel array of radiation. All such radiation subsystems are well known in the art.

A controller 34 is coupled to the vertical movement mechanism 16, the resin level subsystem 18, the coating subsystem 26, the imaging subsystem 30, and other portions of system 2. The controller 34 includes a processor 36 (such as a CPU or central processing unit) coupled to a non-transient information storage device 38 (such as flash memory). Storage device 38 stores software instructions. Controller 34 is configured to operate the portions of system 2 as the processor 36 executes the software instructions stored on the non-transient information storage device 38.

Controller 34 can includes a single unit that is associated with system 2 or it can include a plurality of control units that can be co-located with and or remotely located relative to the illustrated system 2.

Figure 2:
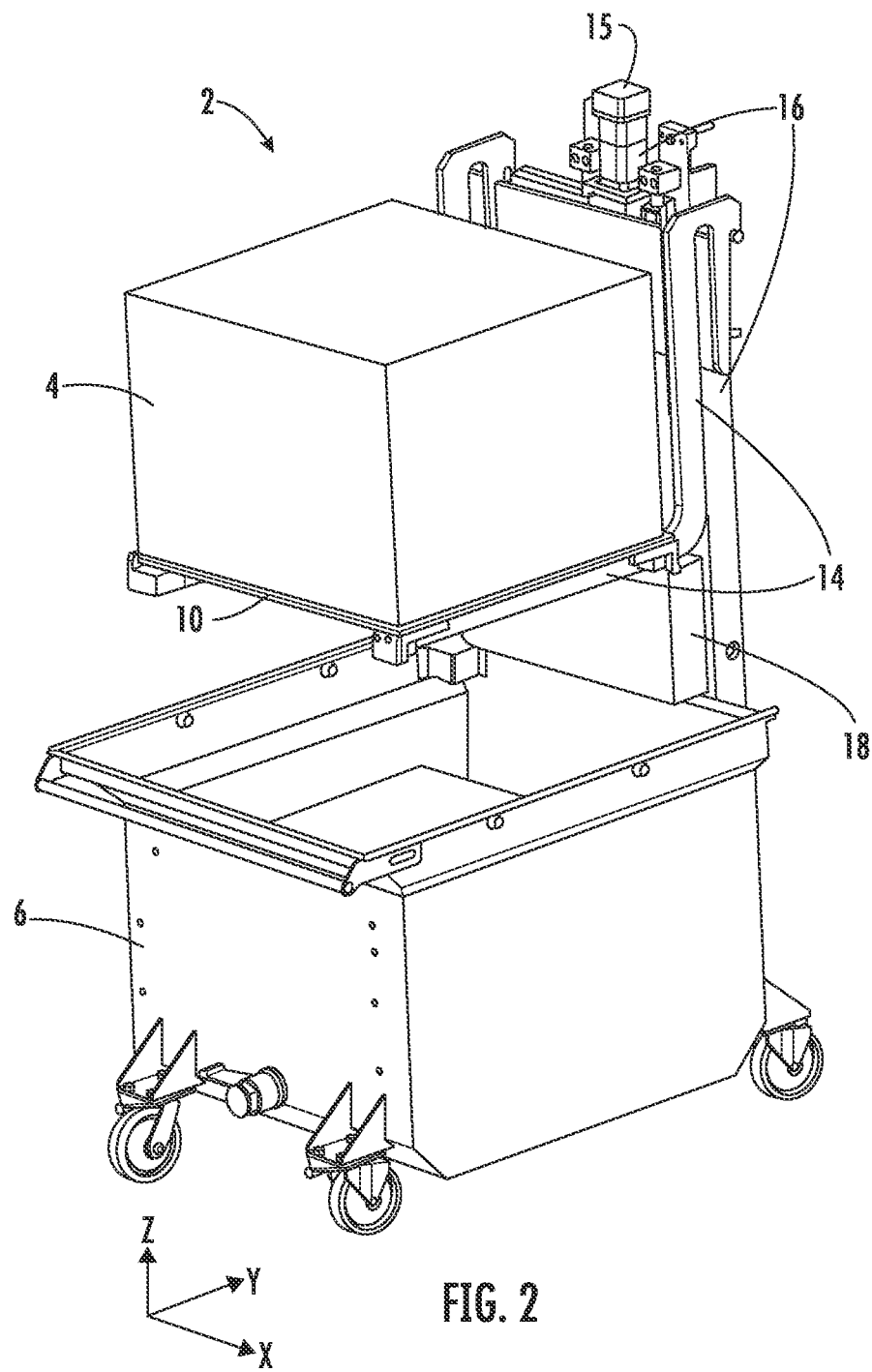
FIG. 2 is an isometric drawing that illustrates certain components of an embodiment of a three-dimensional (3D) printing system for manufacturing or fabricating a 3D article.

FIG. 2 is an isometric drawing that illustrates certain components of an embodiment of system 2. In the illustrated embodiment from a user point of view the axes X, Y, and Z can be described. The lateral X-axis extends from left to right. The lateral Y-axis extends from front to back or from front to rear. The vertical Z-axis extends upward. The illustrated components include the resin vessel 6, build plate 10, build plate support structure 14, vertical movement mechanism 16, and resin level subsystem 18 (the weight that is raised and lowered). The vertical movement mechanism 16 includes a motor 15 coupled to a vertical lead screw for providing vertical positioning of the build plate support structure 14 and the build plate 10. Between the build plate support structure 14 and the vertical movement mechanism 16 are a pair of linear bearings (hidden in this figure) to control linearity of motion along the Z-axis. Not illustrated is the coating subsystem 26 and imaging subsystem 30.

Figure 3:
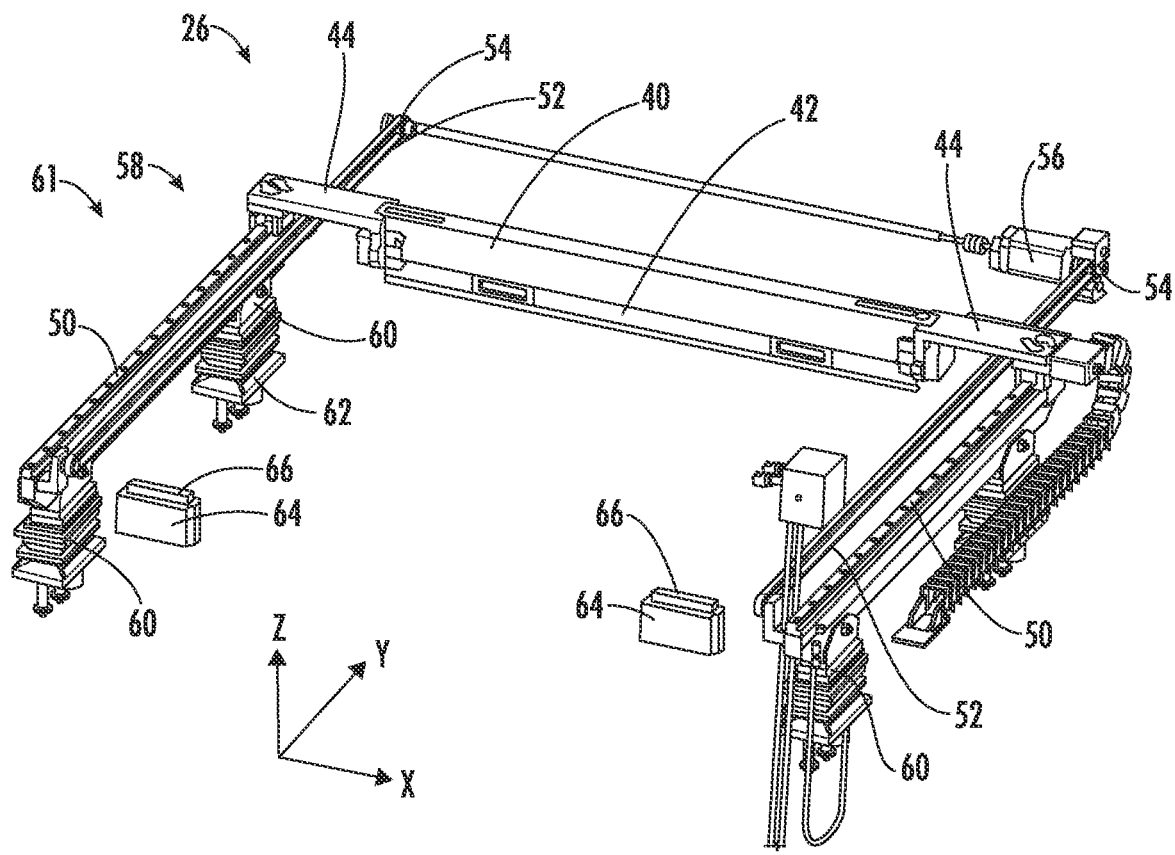
FIG. 3 is an isometric drawing of an embodiment of a coating subsystem in isolation.

FIG. 3 is an isometric drawing of an embodiment of a coating subsystem 26 in isolation. Coating subsystem 26 includes a wiper module 40 or coater module 40 which includes a coater blade 42 that is supported between two end portions 44 which are at opposed ends of the coater blade 42 with respect to the lateral X-axis.

Figure 4:
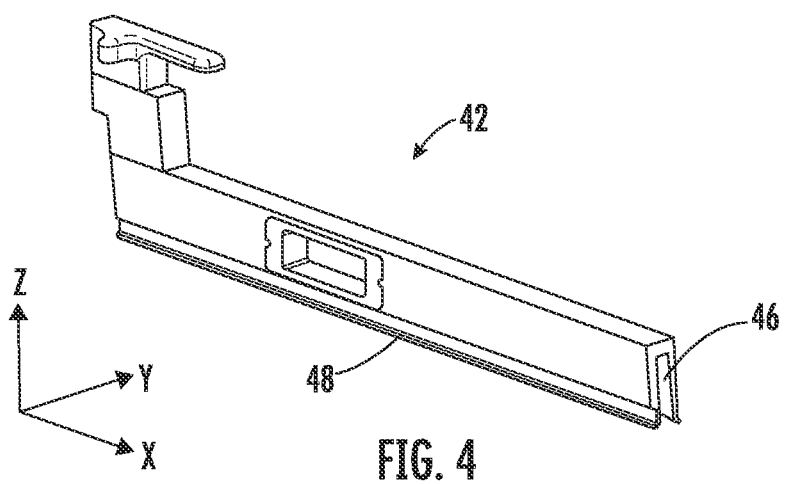
FIG. 4 is an isometric cutaway view of an embodiment of a coater blade in isolation.

FIG. 4 is an isometric cutaway view of the coater blade 42 in isolation. One end of the cutaway view illustrates an internal recess 46 that is at least partially filled with resin 8 to facilitate coating irregular upper surfaces 24 of 3D articles 4. Coater blade 42 also has a lower edge 48.

Referring back to FIG. 3, coating subsystem 26 includes a pair of linear bearings 50 at opposed ends of the coater module 40 with respect to the X-axis. The end portions 44 are in sliding engagement with and supported by the linear bearings 50. The end portions 44 slide upon the linear bearings 50 along the Y-axis.

Two belts 52 are individually supported by pulleys 54 at opposed ends of the coater module 40. The belts 52 are attached to the end portions 44 at the opposed ends of the coater module 40. A motor 56 is coupled to two of the pulleys 54. Rotation of the pulleys 54 by motor 56 causes movement of the belt and translation of the coater module 40 along the Y-axis in sliding engagement and support by the linear bearings 50. The combination of the motor 56, pulleys 54, belts 52, and other possible components can be referred to as a "lateral movement mechanism" 58 for transporting coater module 40 along the Y-axis.

A set of four vertical actuators 60 support and vertically position the linear bearings 50. The vertical actuators 60 are individually coupled between a vertical support 62 (FIG. 5) and one of the linear bearings 50. The linear bearings 50 individually are supported by a front vertical actuator 60 and a rear vertical actuator 60 which enables a height and angular tilt of each linear bearing 50 to be adjusted. In one embodiment, the vertical actuators 60 individually include a motorized lead screw that turns and thereby raises or lowers a nut that is attached to one end portion of one of the linear bearings 50. The set of four vertical actuators 60 and other associated components can be referred to as a "vertical actuator system" 61.

A set of two calibration blocks 64 are laterally disposed within a lateral range of travel of the coater module 40. The calibration blocks 64 individually have an upward facing calibration surface 66. The calibration surface 66 can have a vertical position that is approximately the same as the build plane 22 but the exact height is not critical.

Figure 5:
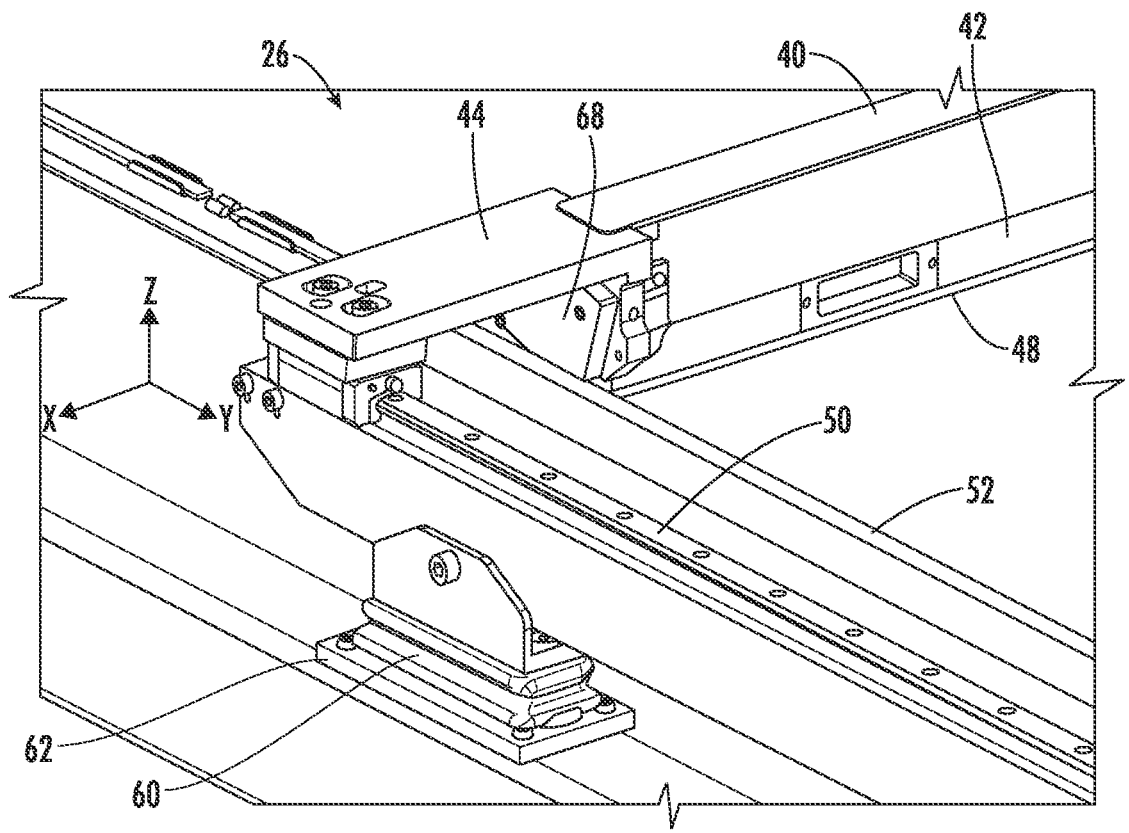
FIG. 5 is an isometric drawing of a portion of a coating subsystem.

FIG. 5 is an isometric drawing of a portion of the coating subsystem 26 which allows a closer view of a number of components discussed supra. The end portions 44 of the coater module individually include a distance sensor 68. Distance sensor 68 is configured to output information indicative of a distance to a surface below distance sensor 68. In the illustrated embodiment, distance sensor 68 is a laser distance sensor that operates on a triangulation principle. The sensor 68 includes a semiconductor laser and a photodiode line. The laser emits a beam that is reflected from a surface back to the photodiode line. The position of incidence upon the photodiode line is a function of the distance being sensed. Other distance sensors 68 are possible that operate on different principles such as ultrasonic sensors and are known in the art for sensing distances to surfaces.

Figure 6:
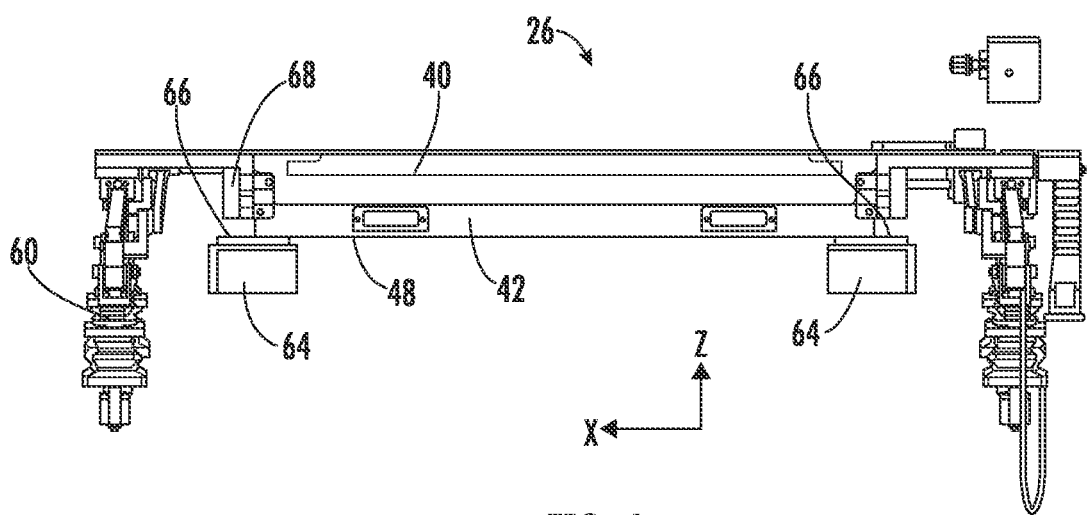
FIG. 6 is a front view of an embodiment of a coating subsystem in isolation.

FIG. 6 is a front view of the coating subsystem 26 in isolation. In this view, the lower edge 48 of the coater blade 42 is in contact with the calibration surfaces 66 of the calibration blocks 64.

Figure 7:
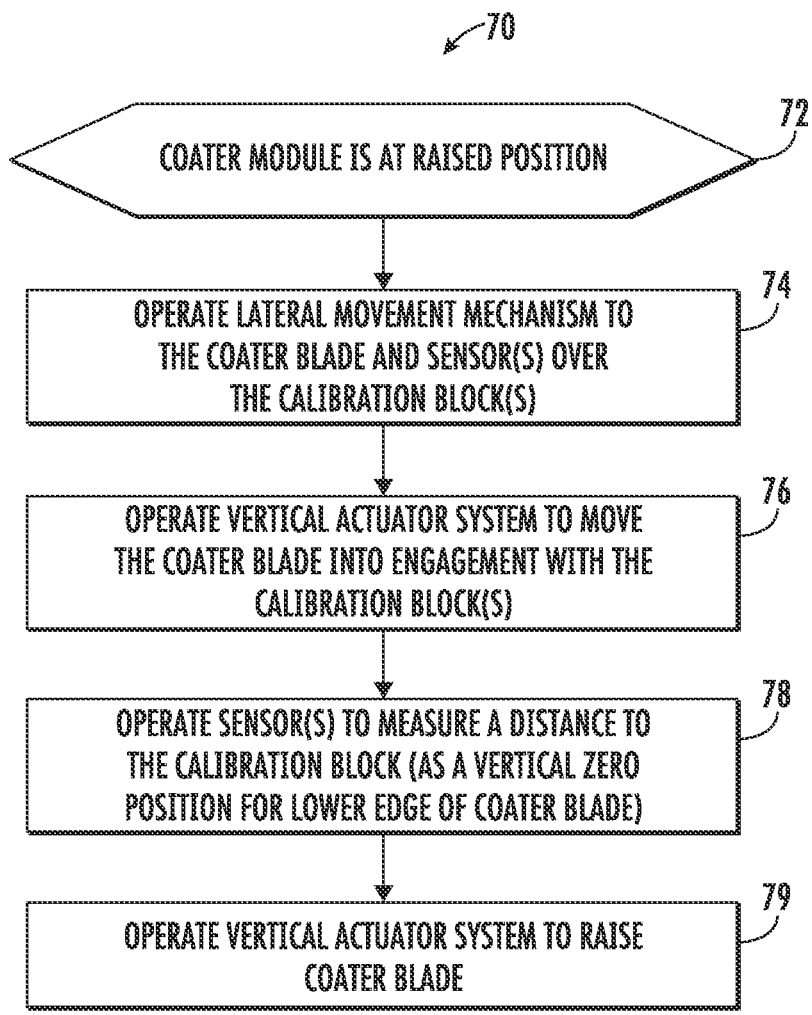
FIG. 7 is a flowchart of an embodiment of a method for vertically locating a lower edge of a coater blade.
Figure 8:
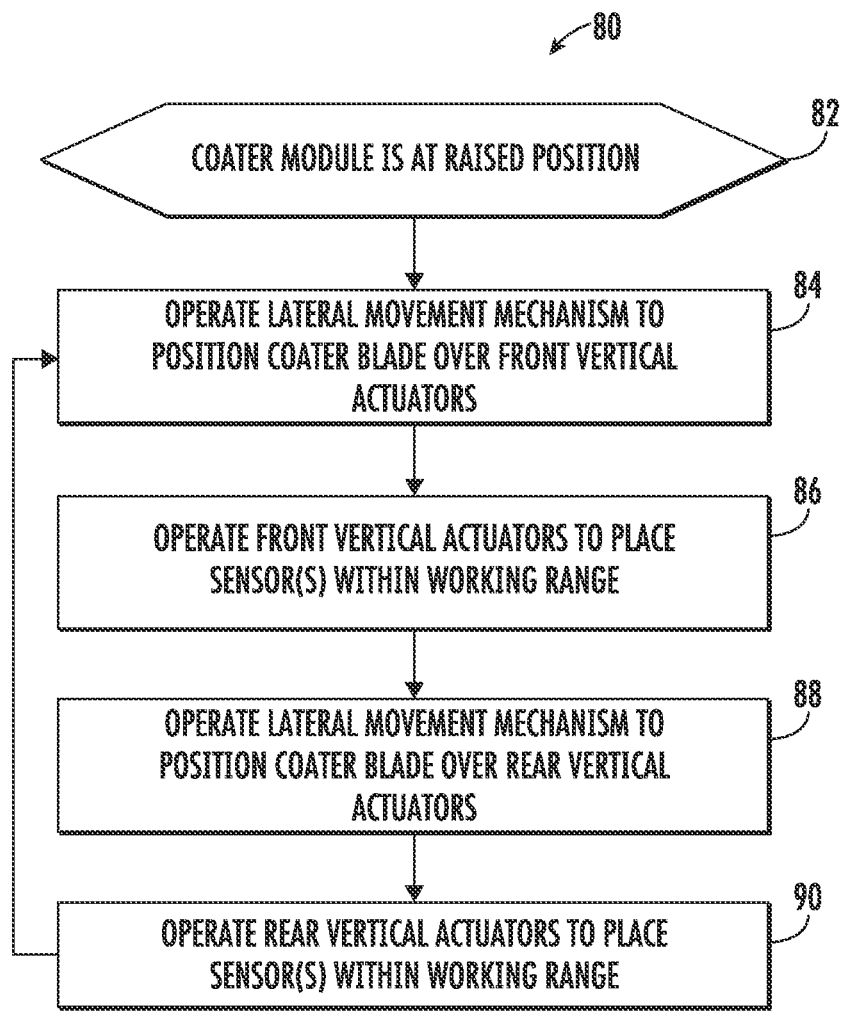
FIG. 8 is a flowchart of an embodiment of a method of adjusting parallelism and optimal distance between a travel of a coater module and a resin upper surface.

FIGS. 7 and 8 are flowcharts that depict methods 70 and 80 for calibrating the coating subsystem 26. Controller 34 is configured to operate components of system 2 to perform methods 70 and 80.

FIG. 7 is a flowchart depicting an embodiment of a method 70 for calibrating the vertical distance sensors 68. According to 72, the coater module 40 is in a raised position. According to 74, the lateral movement mechanism 58 is operated to translate the coater module 40 along the Y-axis until ends of the coater blade 42 and the vertical sensors 68 are individually positioned over one of the calibration surfaces 66.

According to 76, the vertical actuator system 61 is operated to lower the coater module 40 until end portions of the lower edge 48 of the coater blade 42 engage and are in contact with the upper surfaces 66 of the calibration blocks 64 (as per FIG. 6). According to 78, the distance sensors 68 are operated to individually measure a vertical distance to the upper surfaces 66. This measurement is stored as a "zero position" which is a vertical height of the lower edge 48 of the coater blade. According to 79, the vertical actuator system 61 is operated to raise the coater module 40 to lift the lower edge 48 off of the calibration surfaces 66.

FIG. 8 is a flowchart depicting an embodiment of a method 80 of adjusting a parallelism and optimal distance between a travel of the coater module 40 and the resin upper surface 20 (which should be generally coincident to the build plane 22). According to 82, the coater module 40 is in a raised position. According to 74, the lateral movement mechanism 58 is operated to translate the coater module along the Y-axis until the coater blade 42 is laterally positioned at or proximate to the front vertical actuators 60 (front meaning a lower value of Y relative to rear).

According to 86, the front vertical actuators 60 are operated to lower the coater module 40 until the distance sensors 68 are at an optimal sensing range of the resin upper surface 20. The sensors 68 have a zero position at the lower edge 48 of the coater blade, the indicated distance is equal to a vertical distance from the lower edge 48 to the resin upper surface 20.

According to 88, the lateral movement mechanism 58 is operated to translate the coater module along the Y-axis until the coater blade 42 is laterally positioned at or proximate to the rear vertical actuators 60 (rear meaning a higher value of Y relative to the front). According to 90, the rear vertical actuators 60 are operated to lower the coater module 40 until the distance sensors 68 are at an optimal sensing range of the resin upper surface 20. Step 90 is essentially the same as step 86 except at an opposite end of the build plane 22 relative to the Y-axis. Steps 84-90 can be repeated to iteratively calibrate a travel parallelism and distance between the lower edge 48 and the build plane 22.

Figure 9:
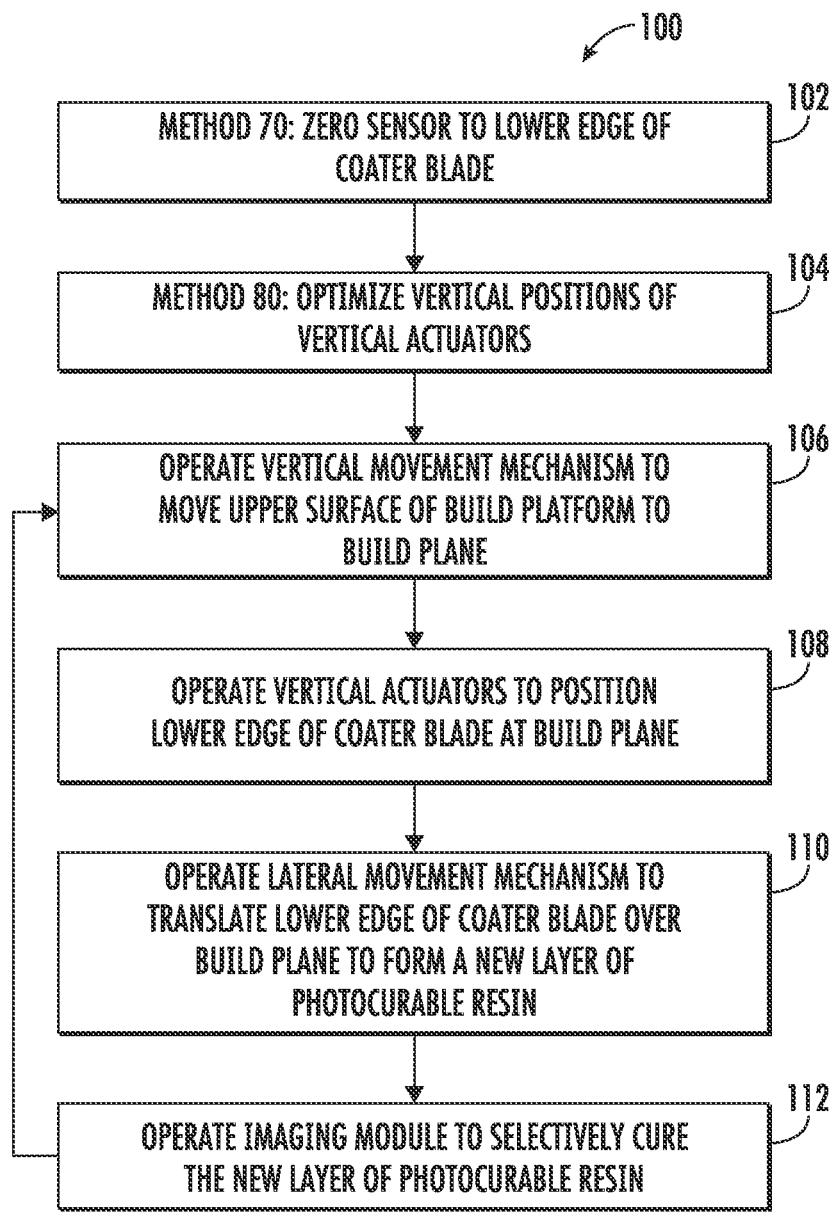
FIG. 9 is a flowchart of an embodiment of a method performed by a controller for manufacturing a 3D article.

FIG. 9 is a flowchart of an embodiment of a method performed by controller 34 for manufacturing a 3D article 4. According to 102, a method 70 (FIG. 7) is performed to "zero" the distance sensors 68 to the lower edge 48 of the coater blade 42. According to 104, method 80 (FIG. 8) is performed to optimize the vertical positions of the vertical actuators 60.

According to 106, the vertical movement mechanism 16 is operated to position the upper surface (12 or 24) of the build plate at the build plane 22. According to 108, the vertical actuator system 61 is operated to position the lower edge 48 of the coater blade 42 coincident with the build plane 22. According to 110, the lateral movement mechanism 58 is operated to translate the lower edge 48 of the coater blade 42 over the build plane 22 to form a new layer 28 of the photocurable resin 8 over the upper surface (12 or 24). According to 112, the imaging subsystem 30 is operated to selectively cure and harden the new layer 28 of photocurable resin 8. As indicated, steps 106-112 are repeated until fabrication of the 3D article 4 is complete.

The specific embodiments and applications thereof described above are for illustrative purposes only and do not preclude modifications and variations encompassed by the scope of the following claims.

What is claimed is:

1. A three-dimensional (3D) printing system comprising:
a vessel configured to contain a photocurable resin having a resin upper surface;
an imaging subsystem configured to selectively cure a layer of resin over a build plane at the resin upper surface;
a coating subsystem including:
a pair of linear bearings including a first linear bearing and a second linear bearing spaced apart from one another along a lateral X-axis and individually extending along a lateral Y-axis;
at least four vertical supports including two vertical supports supporting the first linear bearing and two vertical supports supporting the second linear bearing;
a plurality of vertical actuators individually coupling one of the four vertical supports to one of the pair of linear actuators;
a coater module including a coater blade and having a pair of end portions individually supported by the pair of linear bearings, the coater module extends along the lateral X-axis and is configured to slide along the pair of linear bearings along the lateral Y-axis; and
a lateral movement mechanism coupled to the coater module; and
a controller configured to:
operate the lateral movement mechanism to position the coater module at one end of the build plane with respect to the Y-axis;
operate the plurality of vertical actuators to align the lower edge of the coater blade with the build plane;
operate the lateral movement mechanism to translate the coater blade over the build plane; and
operate the imaging subsystem to selectively cure the layer of resin over the build plane.

2. The three-dimensional (3D) printing system of claim 1 wherein the plurality of vertical actuators individually include a motorized lead screw that is threaded into a nut carried by one of the pair of linear bearings, rotation of the lead screw raises or lowers the one of the pair of linear bearings over one of the at least four vertical supports.

3. The three-dimensional (3D) printing system of claim 1 wherein the pair of end portions include a corresponding pair of distance sensors individually configured to output information indicative of a vertical distance to a surface below the distance sensor.

4. The three-dimensional (3D) printing system of claim 3 wherein the distance sensor is a laser distance sensor that operates on a triangulation principle to determine the vertical distance.

5. The three-dimensional (3D) printing system of claim 3 wherein the controller is configured to calibrate a parallelism and vertical distance between the coater module and the resin upper surface with the following steps:
operate the lateral movement mechanism to position the coater module over a front pair of the plurality of vertical actuators;
operate the front pair of vertical actuators to place the pair of distance sensors within a sensing range of the resin upper surface;
operate the lateral movement mechanism to position the coater module over a rear pair of the plurality of vertical actuators; and
operate the front pair of vertical actuators to place the pair of distance sensors within a sensing range of the resin upper surface.

6. The three-dimensional (3D) printing system of claim 1 including a pair of belts driven by a pair of pulleys, the pair of belts are coupled to the pair of end portions such that rotation by the pair of pulleys translates the coater module along the lateral Y-axis.

7. A method of operating a three-dimensional (3D) printing system comprising:
providing a 3D printing system including:
a vessel configured to contain a photocurable resin having a resin upper surface;
an imaging subsystem configured to selectively cure a layer of resin over a build plane at the resin upper surface;
a coating subsystem including:
a pair of linear bearings including a first linear bearing and a second linear bearing spaced apart from one another along a lateral X-axis and individually extending along a lateral Y-axis;
at least four vertical supports including two vertical supports supporting the first linear bearing and two vertical supports supporting the second linear bearing;
a plurality of vertical actuators individually coupling one of the four vertical supports to one of the pair of linear bearings;
a coater module including a coater blade and having a pair of end portions individually supported by the pair of linear bearings, the coater module extends along the lateral X-axis and is configured to slide along the pair of linear bearings along the lateral Y-axis; and
a lateral movement mechanism coupled to the coater module; and
operating the lateral movement mechanism to position the coater module at one end of the build plane with respect to the Y-axis;
operating the plurality of vertical actuators to align the lower edge of the coater blade with the build plane;

operating the lateral movement mechanism to translate the coater blade over the build plane; and operating the imaging subsystem to selectively cure the layer of resin over the build plane.

8. The method of claim 7 wherein the plurality of vertical actuators individually include a motorized lead screw that is threaded into a nut carried by one of the pair of linear bearings, the method further including rotating the lead screw to raise or lower the one of the pair of linear bearings over one of the at least four vertical supports.

9. The method of claim 7 wherein the pair of end portions include a corresponding pair of distance sensors and further comprising receiving information from the pair of distance sensors indicative of a pair of corresponding vertical distances to a surface below the pair of distance sensors.

10. The method of claim 7 wherein the pair of end portions include a corresponding pair of distance sensors and further comprising calibrating a parallelism and vertical distance between the coater module and the resin upper surface with the following steps:

operating the lateral movement mechanism to position the coater module over a front pair of the plurality of vertical actuators;

operating the front pair of vertical actuators to place the pair of distance sensors within a sensing range of the resin upper surface;

operating the lateral movement mechanism to position the coater module over a rear pair of the plurality of vertical actuators; and operating the front pair of vertical actuators to place the pair of distance sensors within a sensing range of the resin upper surface.

11. The method of claim 7 wherein the 3D printing system includes a pair of belts driven by a pair of pulleys, the pair of belts are coupled to the pair of end portions, the method further includes rotating the pair of pulleys to translate the coater module along the lateral Y-axis.

12. A three-dimensional (3D) printing system comprising:

a vessel configured to contain a photocurable resin having a resin upper surface;

an imaging subsystem configured to selectively cure a layer of resin over a build plane at the resin upper surface;

a coating subsystem including:

a pair of linear bearings including a first linear bearing and a second linear bearing spaced apart from one another along a lateral X-axis and individually extending along a lateral Y-axis;

four vertical supports including a first pair of vertical supports supporting the pair of linear bearings along a first position along the Y-axis and a second pair of two vertical supports supporting the pair of linear bearings along a second position along the Y-axis;

four vertical actuators including a first pair of vertical actuators coupled between the pair of linear bearings and the first pair of vertical supports and a second pair of vertical actuators coupled between the pair of linear bearings and the second pair of vertical supports;

a coater module including a pair of end portions supported by the pair of linear bearings with a coater blade extending along the X-axis between the pair of end portions, the pair of end portions including a corresponding pair of distance sensors; and a lateral movement mechanism coupled to the pair of end portions; and a controller configured to:

perform a calibration upon the coating subsystem, the calibration utilizing the lateral movement mechanism, the four vertical actuators, and the pair of distance sensors;

operate the lateral movement mechanism to position the coater module at one end of the build plane with respect to the Y-axis;

operate the plurality of vertical actuators to align the lower edge of the coater blade with the build plane;

operate the lateral movement mechanism to translate the coater blade over the build plane; and operate the imaging subsystem to selectively cure the layer of resin over the build plane.

13. The three-dimensional (3D) printing system of claim 12 wherein the four vertical actuators include four motorized lead screws that are threaded into nuts carried by the pair of linear bearings, the controller is configured to rotate the four motorized lead screws to vertically position and level the pair of linear bearings.

14. The three-dimensional (3D) printing system of claim 12 wherein the calibration includes determining a vertical position of a lower edge of the coater blade.

15. The three-dimensional (3D) printing system of claim 12 wherein the calibration includes calibrating a parallelism and a vertical distance between the coater module and the resin upper surface.

* * * * *